United States Patent
Wojcik et al.

(10) Patent No.: US 9,976,754 B2
(45) Date of Patent: May 22, 2018

(54) BACKGUARD PANEL WITH INTEGRATED PROUD GLASS CONTROL MOUNT

(71) Applicant: Electrolux Home Products, Inc., Charlotte, NC (US)

(72) Inventors: Aaron Wojcik, Hendersonville, TN (US); Daniel Hill, Springfield, TN (US); Scott Speck, Springfield, TN (US); Michael Anthony Howard, Gallatin, TN (US)

(73) Assignee: Electrolux Home Products, Inc., Charlotte, NC (US)

( * ) Notice: Subject to any disclaimer, the term of this patent is extended or adjusted under 35 U.S.C. 154(b) by 622 days.

(21) Appl. No.: 14/585,913

(22) Filed: Dec. 30, 2014

(65) Prior Publication Data

US 2016/0187003 A1 Jun. 30, 2016

(51) Int. Cl.
*F24C 15/12* (2006.01)
*F24C 3/12* (2006.01)
*F24C 5/16* (2006.01)
*F24C 15/00* (2006.01)
*G05G 25/04* (2006.01)
*A47J 37/12* (2006.01)

(52) U.S. Cl.
CPC .............. *F24C 15/12* (2013.01); *F24C 3/124* (2013.01); *F24C 5/16* (2013.01); *F24C 15/007* (2013.01); *A47J 37/1271* (2013.01); *G05G 25/04* (2013.01)

(58) Field of Classification Search
CPC ........ F24C 15/12; F24C 15/007; F24C 15/16; F24C 3/124; F24C 3/126; F24C 3/12; A47J 37/1271; G05G 25/04; G05G 25/00

USPC .............. 126/214 B, 211; 220/3.5, 3.6, 477; 206/724, 788
IPC .......................... F24C 15/12,15/00, 15/16, 3/12
See application file for complete search history.

(56) References Cited

U.S. PATENT DOCUMENTS

| 2,147,382 | A | | 2/1939 | Rogers | |
|---|---|---|---|---|---|
| 2,453,832 | A | | 11/1948 | Dadson | |
| 2,609,476 | A | | 9/1952 | Ackermann | |
| 2,703,837 | A | * | 3/1955 | Crone | F24C 7/082 126/214 B |
| 2,866,450 | A | * | 12/1958 | Reeves | F24C 15/12 126/213 |
| 3,231,225 | A | * | 1/1966 | Bakke | G01D 11/24 220/3.5 |

(Continued)

*Primary Examiner* — Gregory Huson
*Assistant Examiner* — Daniel E Namay
(74) *Attorney, Agent, or Firm* — Pearne & Gordon LLP

(57) ABSTRACT

Provided is a backguard panel for an appliance with an integrated front-mounted proud-glass control unit. An opening is defined within the front wall of the backguard panel has for receiving the control unit. A recessed seat, configured to receive a sealing gasket for sealing the space between the control unit and the backguard panel, surrounds the opening. The control unit has a housing suspended from a proud glass pane that protrudes forward of the front wall of the backguard panel when the housing is fully inserted into the opening. Rearwardly projecting brackets establish a friction fit to temporarily hold the control unit in place until fasteners can be installed to apply a compressive force on the sealing gasket between the glass pane and the backguard panel. A cooking appliance with a backguard panel with an integrated front-mounted proud-glass control unit is also provided.

14 Claims, 5 Drawing Sheets

(56) References Cited

U.S. PATENT DOCUMENTS

| | | | |
|---|---|---|---|
| 3,248,078 A * | 4/1966 | Ast | H02B 1/048 165/185 |
| 4,894,493 A | 1/1990 | Smith | |
| 5,549,098 A * | 8/1996 | Bales | F24C 15/108 126/211 |
| 5,653,221 A * | 8/1997 | Luken | F24C 7/082 126/299 C |
| 5,675,123 A * | 10/1997 | Proctor | H01R 13/506 174/58 |
| 5,726,424 A * | 3/1998 | Koether | F24C 7/087 219/412 |
| 6,584,744 B1 | 7/2003 | Schultheis | |
| 2005/0194004 A1* | 9/2005 | Boswell | F24C 15/102 126/211 |
| 2010/0154774 A1* | 6/2010 | Balbinotti | F24C 15/008 126/273 R |
| 2012/0138042 A1* | 6/2012 | Huntscha | F24C 7/083 126/211 |
| 2013/0025579 A1* | 1/2013 | May | F24C 7/00 126/19 R |

\* cited by examiner

BACKGUARD PANEL WITH INTEGRATED PROUD GLASS CONTROL MOUNT

BACKGROUND

1. Field of the Invention

The following description relates generally to an appliance and, more specifically, to a front-mounted, proud-glass control unit integrated into the backguard panel of the appliance without mounting brackets.

2. Description of Related Art

Backguard panels typically house control units for operating appliances. Conventional appliances include control units mounted from the rear side of the backguard panel using snap-in brackets.

SUMMARY

The following presents a simplified summary of the invention in order to provide a basic understanding of some example aspects of the invention. This summary is not an extensive overview of the invention. Moreover, this summary is not intended to identify critical elements of the invention or to delineate the scope of the invention. The sole purpose of the summary is to present some concepts in a simplified form as a prelude to the more detailed description that is presented later.

According to one general aspect, a backguard panel for an appliance with an integrated front-mounted proud-glass control unit may be provided. The backguard panel has a front wall, a top wall with a downwardly projecting rim portion, a rear wall, and a bottom wall. An opening is defined within the front wall of the backguard panel for receiving a control unit mounted from the front wall of the backguard panel. A recessed seat, configured to receive a sealing gasket for sealing the space between the control unit and the backguard panel, surrounds the opening. The backguard panel also includes rearwardly projecting brackets for securing the control unit inside the backguard panel.

In another general aspect, the control unit has a housing suspended from a proud glass pane that protrudes forward of the front wall of the backguard panel when the housing is fully inserted into the opening.

In another general aspect, the rearwardly projecting brackets establish a friction fit to temporarily hold the control unit in place until fasteners can be installed to apply a compressive force on the sealing gasket between the glass pane and the backguard panel.

In another general aspect, a cooking appliance with a backguard panel with an integrated front-mounted proud-glass control unit is also provided.

In another general aspect, a method of assembling a front-mounted control unit into the backguard panel of an appliance is provided. The method includes the steps of inserting the control unit into a housing covered by a glass pane and placing a sealing gasket about the external periphery of the housing. The method also includes the steps of inserting the housing from a front wall of the background panel into an opening defined in the backguard panel until the glass pane is positioned adjacent to the front surface of the background panel and the gasket is aligned with the recess surrounding the opening. The method further includes the step of temporarily securing the control unit into the backguard panel with a set of rearwardly projecting brackets formed as friction-fit snaps after the control unit has been fully inserted into the backguard panel. The method further includes the steps of inserting fasteners through the perforations in flanges inwardly extending from the projecting brackets and into a portion of the housing to urge the glass pane toward the backguard panel, compressing the gasket within the recess between the control unit and the backguard panel, and securing the fasteners into the perforations of the housing.

Other features and aspects may be apparent from the following detailed description, the drawings, and the claims.

BRIEF DESCRIPTION OF THE DRAWINGS

The foregoing and other aspects of the subject application will become apparent to those skilled in the art to which the subject application relates upon reading the following description with reference to the accompanying drawings.

DETAILED DESCRIPTION

Figure 1:
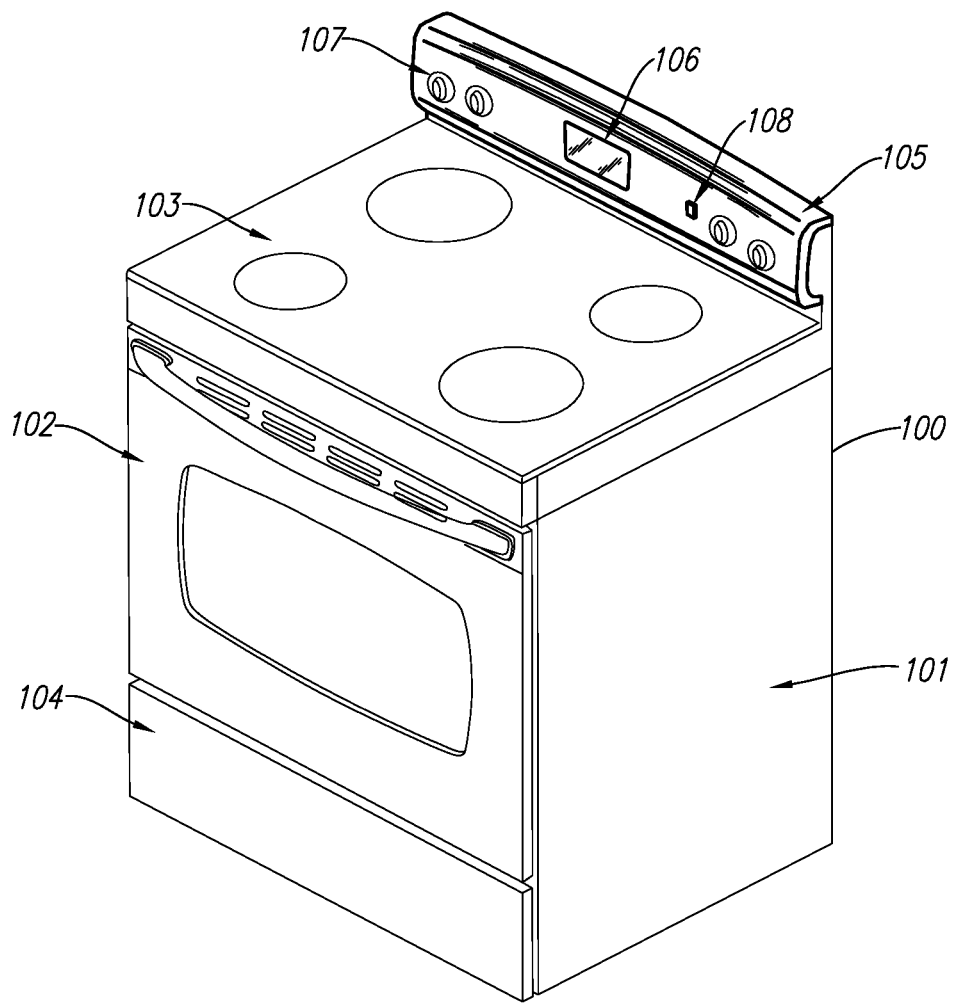
FIG. 1 is a perspective view of a cooking appliance incorporating a backguard panel with an integrated control unit, according to an embodiment.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein. Moreover, certain terminology is used herein for convenience only and is not to be taken as a limitation on the present invention.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

FIG. 1 shows an illustrative embodiment of an appliance in the form of a cooking range 100. The cooking range 100 can be wall-mounted or freestanding, although other configurations could also be used. The cooking range 100 includes at least a casing 101, a cooking cavity 102 enclosed by the casing 101, a cook top 103, a drawer 104, and a backguard panel 105 housing control and display elements.

The embodiment of the cooking appliance in FIG. 1 includes both an oven cavity 102 and cooktop heating elements arranged on the cooktop 103. However, alternate embodiments of the cooking appliance can include only the cook top 103, without the oven cavity 102. Yet other embodiments include a so-called wall oven, which includes only an oven cavity 102 for cooking food and lacks the cooktop 103 surface, and is to be installed within an aperture recessed into a wall of a kitchen, for example. The oven door of a wall oven is arranged substantially flush with, but immediately forward of the surrounding wall defining the aperture. For the sake of brevity, however, the embodiment of the cooking appliance shown in FIG. 1 will be used as an example to describe the backguard panel 105 below.

As illustrated in FIG. 1, the cooktop 103 provides a cooking surface with multiple cooking zones. The cooktop 103 has a front portion where an oven door leading into the oven cavity is located, a rear portion opposite the front portion that is to be placed adjacent to a wall, and two side portions (left and right), as viewed while observing the front portion of the cooking range 100.

As further shown on FIG. 1, the backguard panel 105 is disposed at the rear end of the cooktop 103, extending upward from the upper surface of the cooktop 103. In the embodiment illustrated in FIG. 1, the front wall of the backguard panel 105 is substantially perpendicular to the upper surface of the cook top 103. However, embodiments are not limited thereto and other configurations are possible. For example, in another embodiment, the front wall of the backguard panel 105 may be inclined relative to the surface of the cooktop 103 toward the rear portion of the cooktop 103, providing a better view of the control and display elements to a user facing the front of the cooking range 100. According to yet other embodiments, the backguard panel 105 can be placed elsewhere on the cooking range 100 to support the control and display elements at any desired location of the cooking range 100. For instance, the panel supporting the control and display elements can be arranged adjacent to the front portion of the cooking range 100, vertically above the oven door restricting access into the oven cavity 102. For the sake of brevity, however, the cooking range 100 will be described herein with the backguard panel 105 and the control and display elements arranged adjacent to, and extending upwardly from, the rear portion of the cooking range 100.

As shown in FIG. 1, the backguard panel 105 houses a control unit 106 and supports a plurality of individual control elements 107, and may additionally include various display elements 108, such as brand names, logos, etc. Although the embodiment shown in FIG. 1 includes only one control unit 106, other embodiments may include more than one control unit 106.

As illustrated in FIG. 1, the control unit 106 extends into an interior of the backguard panel 105 through the front wall thereof. The control unit 106 may be operatively connected to one or more of the individual control elements 107 or other suitable input devices for receiving various operation signals to control the cooktop 103 and/or the oven cavity 102. The control unit 106 may also include a display device that is operable to display computer-generated information related to the operation of the cooktop 103 and/or the cooking cavity 102, and optionally other information such as the current time, for example.

Figure 2:
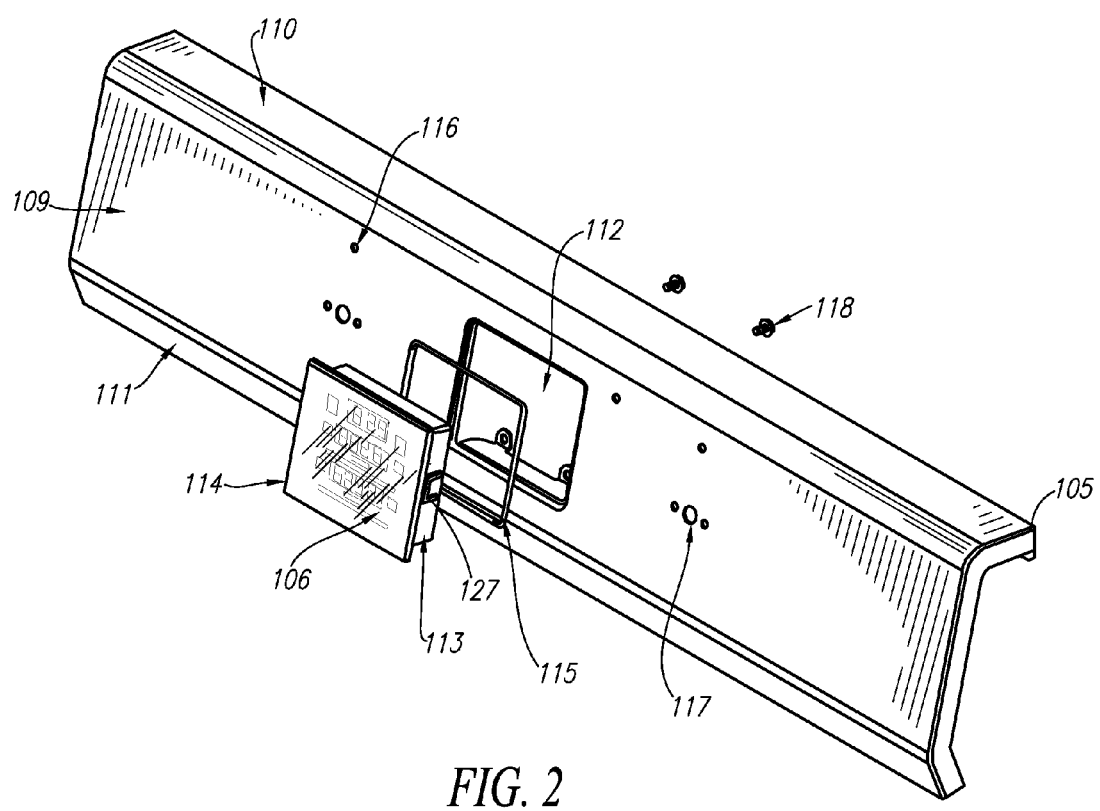
FIG. 2 is an enlarged, front perspective view of a backguard panel and a control unit assembly, according to an embodiment.

FIG. 2 illustrates an enlarged, front perspective view of a backguard panel 105 and control unit 106 in a position for assembly, according to an embodiment. As shown, the backguard panel 105 has an outwardly-facing front wall 109 that is observable by a cook standing in front of the cooking range 100, a top wall 110, an inwardly-facing (e.g., defining a portion of a cavity within the backguard panel 105) rear wall (not shown in FIG. 2), and a bottom wall 111.

An opening 112 is defined within the front wall 109 of the backguard panel 105. The opening 112 is adapted to receive the portion of the control unit 106 that extends through the front wall 109 during installation as the control unit 106 is moved rearwardly, towards the interior cavity defined by the backguard panel 105 from a location in front of the front wall 109. Fully inserted, the control unit 106 can, at least temporarily, be supported by the front wall 109 of the backguard panel 105 without the use of any mounting brackets or other fasteners. In view of the mounting arrangement of the control unit 106, it may be referred hereafter as a front-mounted control unit.

As further shown in FIG. 2, the control unit 106 includes a housing 113. The shape and exterior dimensions of the housing 113 closely approximate, but may be slightly smaller than the inside dimensions of the opening 112 in the backguard panel 105, which allows the housing 113 to be inserted into the opening 112. The similarities between the shape and dimensions of the housing 113 and the opening 112 promote a desired arrangement of the control unit 106 within the opening 112, and interfere with rotation of the housing 113 (and control unit 106) within the opening 112. A transparent (preferably glass) pane 114 covers the front surface of the housing 113. The glass pane 114 extends outwardly, beyond a terminal region of the housing 113 in at least one lateral dimension to limit insertion of the control unit 106 into the opening 112 because the glass pane 114 will not fit into the opening 112 as a result of at least said lateral dimension. In the embodiment appearing in FIGS. 2 and 3, an overhanging portion of the glass pane 114 extends laterally beyond each side of the housing 113, thereby forming a flanged region 130 about the entire perimeter of the glass pane 114. This flanged region 130 is larger than the periphery of the opening 112, and acts as a stop that interferes with further insertion of the control unit 106 into the opening beyond a point where the flanged region 130 makes contact with the outwardly-facing surface of the front wall 109. According to alternate embodiments, respective portions of the plastic housing 113 and the outwardly-facing surface or other portion of the front wall 109 can be configured such that a portion of the housing 113 contacts the outwardly-facing surface or other portion of the front wall 109 as the control unit 106 is inserted into the opening before the glass pane 114 does. For example, the depth D1 of the housing 113, as shown in FIG. 2, can be made to be similar to, but slightly greater than the depth D2 (FIG. 3) of the space that is to receive the housing 113 of the control unit 106. This recess extends between the backguard panel 105 and the flanges 122 discussed below. Thus, when the control unit 106 is fully inserted into the opening 112 and the housing 113 rests against the flanges 122, the transparent pane 114 is elevated slightly above the outward-facing surface of the front wall 109. Such a configuration serves to limit, and optionally prevent, a tensional force from being exerted on the glass pane 114, urging the glass pane 114 away from the housing 113 while the control unit 106 is secured to the backguard panel 105.

The glass pane 114 can optionally be coupled to and support the portion of the control unit 106 inserted into the opening 112. And since the flanged portion 130 along the underside of the glass pane 114 (in the embodiment of FIG. 2) rests against the outwardly-facing surface of the front wall 109, an external surface through which the information displayed by the display device is to be viewed by a cook protrudes forward of the outwardly-facing surface of the front wall 109 of the backguard panel 105 once the control unit 106 has been fully installed. Thus, with the control unit 106 fully installed, the glass pane 114 has the appearance of having been adhered onto the outwardly-facing surface of the front wall 109 to conceal the opening 112. Such an arrangement of the glass pane 114 can be referred to as a "proud" glass pane 114.

As further illustrated in FIG. 2, a sealing gasket 115 can be provided to extend about the external periphery of the housing 113 to seal the space between the control unit 106 and the surrounding portion of the backguard panel 105 within the opening 112. The sealing gasket 115 may be placed around the external periphery of the housing 113 of the control unit 106 as part of the installation process, and can be formed of any material that can be substantially-elastically compressed. Such a suitable material will not exhibit compression relaxation to a point where the gasket 115 allows liquids present on the front wall 109 to freely enter the interior of the backguard panel 105.

One or more additional apertures 116 and 117, optionally of different sizes but much smaller than the opening 112, can optionally be formed within the front wall 109 of the backguard panel 105 for receiving portions of control elements (e.g., knob stems, fasteners securing the control elements in place, wires connected to a pushbutton control element, etc.) or display elements to be present as part of the backguard panel 105.

Figure 3:
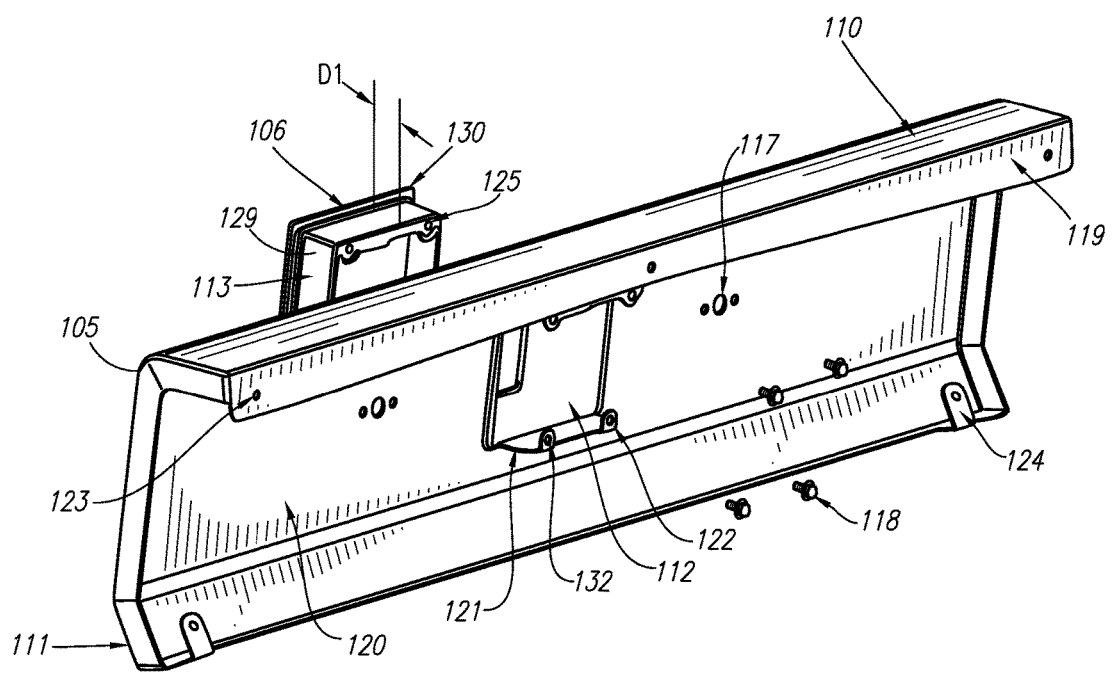
FIG. 3 is a rear perspective view of a backguard panel and a control unit assembly according to an embodiment.

FIGS. 2 and 3 also illustrate fasteners 118 that secure the control unit 106 in place as part of the backguard panel 105, once the control unit 106 has been properly positioned. The fasteners 118 may be threaded screws, bolts, or similar fasteners adapted to be cooperate with one or more brackets 121 disposed within the interior cavity of the backguard panel 105. In the embodiment of FIG. 3, the brackets extend inwardly into that cavity, from the inward-facing side of the front wall 109, as further described in detail below.

FIG. 3 is an exploded rear view of the backguard panel 105, showing the inward-facing surface of the front wall 109, and the control unit 106 in a position for assembly, according to an embodiment. FIG. 3 also shows the top wall 110 of the backguard panel 105 with a downwardly projecting rim portion 119, the inward-facing surface 120 of the front wall 109, the bottom wall 111, and the opening 112 defined within the front wall 109 of the backguard panel 105. At least one, and optionally two or more brackets 121 are arranged adjacent to the opening 112 and project away from the inward-facing surface 120 of the backguard panel 105. The brackets 121 can optionally be angled to extend into the path of the housing 113 of the control unit 106 as it is inserted into the opening 112. The brackets 121 can optionally be configured to establish a friction-fit between the brackets 121 and the housing 113 to temporarily hold the control unit 106 within the opening 112 formed in the front wall 109 of the backguard panel 105 as the control unit 106 is inserted into the opening 112. According to another embodiment, the housing 113 can be equipped with at least one, and optionally a plurality of snaps 127 (FIG. 2) that protrude outwardly, away from one or more planar side surfaces 129 defining an exterior perimeter of the housing 113. For the embodiment appearing in FIG. 2, the snaps 127 on opposite side surfaces 129 include an angled surface 135, shown in FIG. 5. The angled surface 135 protrudes further away from the side surface 129 of the housing 113 as the angled surface 135 extends forward (e.g., in a direction generally toward the glass pane 114) from a relatively-inward region 137 relative to the backguard panel 105, when assembled, toward a relatively forward region 139 adjacent to a perimeter of the opening 112. A flanged region 141 is formed where the angled surface 135 terminates at the relatively-forward region 139, leading into a recessed region 142 formed in the housing 113. The perimeter of the opening 112, the snap(s) 127, or a combination thereof can be substantially-elastically deformable to an extent that permits the snap(s) 127 to be inserted beyond the perimeter of the opening 112 and retain their unbiased configuration after full insertion.

Returning to FIG. 3, the brackets 121 can optionally be integrally formed as a monolithic unit as part of the front wall 109 of the backguard panel 105 such that they are not separable from the front wall 109 without damaging the front wall 109. Yet other embodiments can optionally utilize separate brackets applied to the inward-facing surface 120 of the front wall 109. But regardless of their configuration, each bracket 121 includes an inward-extending flange 122 that is positioned in the path traveled by the housing 112 as the control unit 106 is inserted through the opening 112. Portions of the housing 113 will eventually make contact with the flanges 122 when the control unit 106 is fully inserted to prevent further insertion of the control unit 106 through the opening 112. Each flange 122 can also include an aperture 132 of suitable size to receive one of the fasteners 118 for securing the control unit 106 into place on the backguard panel 105. In one embodiment, the apertures 132 may optionally be made internally threaded to cooperate with external thread of the fasteners 118, but alternate embodiments are not limited thereto and other configurations are possible.

FIG. 3 also shows mounting perforations 123 on the downwardly projecting rim portion 119 of the top wall 110 of the backguard panel 105 and mounting projections 124 extending upwardly from the bottom wall 111 of the backguard panel 105. Mounting perforations 123 and mounting projections 124 may be used for mounting the backguard panel 105 into the cooking appliance 100 or to a wall or other surface facing the rear portion of the cooking appliance 100.

FIG. 3 further illustrates a rear view of the control unit 106 and the housing 113. Threaded bores 125 are formed on the rear side of the housing 113 of the control unit 106. If the housing 113 of the control unit 106 is properly positioned within the opening 112, the internally threaded bores 125 will be aligned with the apertures 132 and adapted to receive the fasteners 118 inserted through the apertures 132 to secure the control unit 106 into the backguard panel 105.

Figure 4:
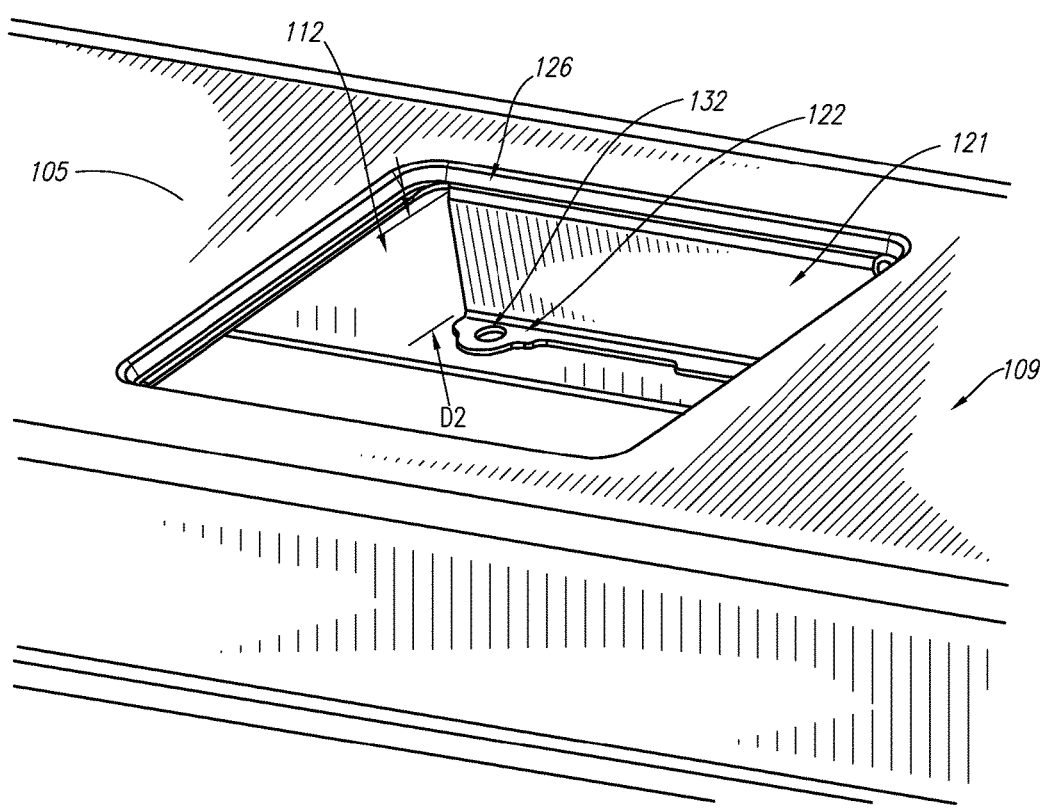
FIG. 4 is an enlarged upper perspective view of an opening surrounded by a recessed seat defined within the front wall of the backguard panel for receiving a front-mounted control unit, according to an embodiment.

FIG. 4 is an enlarged upper perspective view of the opening 112 defined within the front wall 109 of the backguard panel 105 for receiving a front-mounted control unit 106, according to an embodiment. FIG. 4 also shows a different view of one of the brackets 121 surrounding the opening 112 and projecting from the rear wall 120 (FIG. 3) of the backguard panel 105, and of the inward-extending flange 122 with a perforation adapted to receive a fastener for securing the control unit 106 into place inside the backguard panel 105.

As further illustrated in FIG. 4, a recessed seat 126 extends at least partially about, and optionally surrounds the opening 112. The recessed seat 126 is configured to receive the sealing gasket 115 discussed above with reference to FIG. 2 for sealing a space between the control unit 106 and the surrounding portion of the backguard panel 105.

Figure 5:
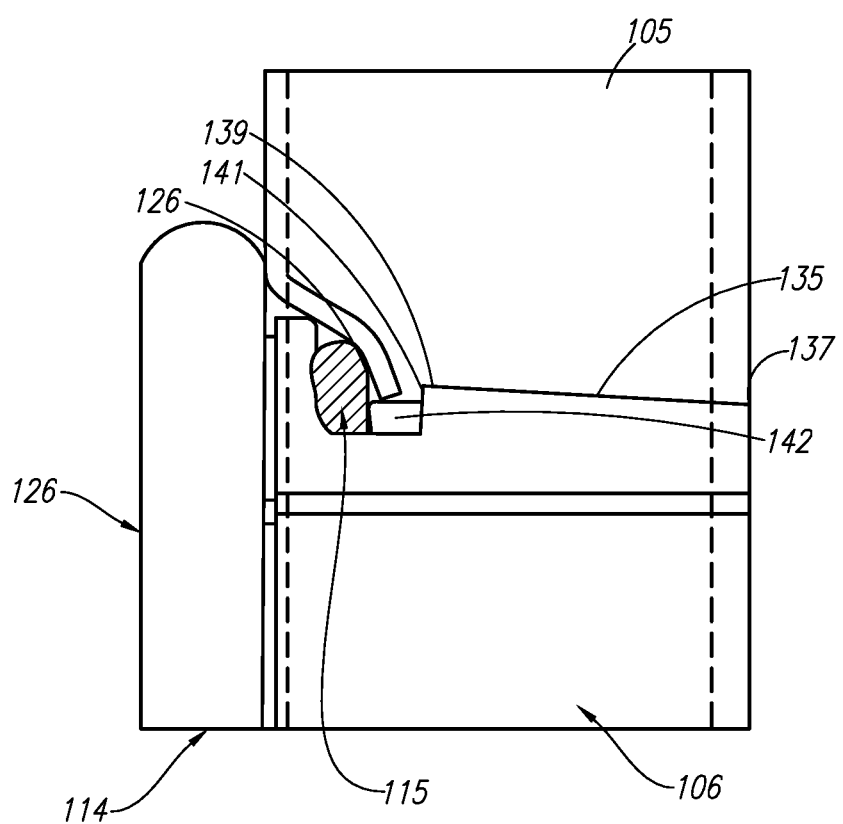
FIG. 5 is an enlarged cross-sectional view of the backguard panel with an installed control unit illustrating the sealing arrangement between the control unit and the backguard panel, according to an embodiment.

FIG. 5 is an enlarged cross-sectional view of a portion of the backguard panel 105 with an installed control unit 106. FIG. 5 illustrates the sealing arrangement between the control unit 106 and the backguard panel 105, according to an embodiment. FIG. 5 shows a small portion of the sealing gasket 115 received by the recessed seat 126 which surrounds the opening 112 in the backguard panel 106. As discussed above with reference to FIG. 2, the sealing gasket is placed around the external periphery of the housing 113 of the control unit 106.

During installation, the housing 113 is inserted through the outward-facing side of the front wall 109 of the background panel 105 into the opening 112 until the glass pane 114 is positioned adjacent to the outward-facing surface of the front wall 109 and the sealing gasket 115 is aligned with the surface of the recessed seat 126 surrounding the opening 112. When the control unit 106 is urged into the space between the opposing brackets 121 (shown in FIG. 3 and discussed above), the brackets 121 can optionally establish a friction fit to temporarily hold the control unit 106 in place until the mechanical fasteners 118 can be installed to apply a compressive force on the sealing gasket 115 between the glass pane 114 and the backguard panel 105. According to alternate embodiments, the control unit 106 is inserted through the outward-facing surface of the front wall 109 to extend the housing 113 into the opening 112. As the housing 113 is inserted into the opening 112, the angled surfaces 135 of the snaps 127 on each of the opposite side surfaces 129 of the housing 113 are also inserted into the opening, leading with the relatively-inward region 137. A portion of the angled surface 135 can travel along the perimeter of the backguard panel 105 (e.g., a perimeter of the recessed seat 126) defining the opening 112 until the flanged region 141 is disposed beyond the front wall 109. With the housing 113 sufficiently inserted into the opening 112, the flanged region 141 extends outwardly beyond the perimeter of the opening 112, to contact an inward-facing surface (e.g., rear wall 120) of the backguard panel 105 if the control unit 106 is urged in an outward direction through the outward-facing side of the front wall 109. This contact interferes with removal of the control unit 106 until the control unit 106 can be secured in place. Inserting fasteners 118 through the apertures 132 in the flanges 122 and into the threaded bores 125 of the housing 113 urges the flanged portions 130 of the glass pane 114 toward the outward-facing surface of the front wall 109, thereby compressing the sealing gasket 115 within the recessed seat 126 between the control unit 106 and the backguard panel 105 and securing the control unit 106 in place.

The sealing gasket 115 seals the space between the glass pane 114 covering the control unit 106 and the surrounding portion of the backguard panel 105, thereby preventing passing of steam and/or liquid between the backguard panel 105 and the control unit 106 when the cooking appliance is in operation.

In one embodiment, the sealing gasket 115 may be a rubber sealing gasket. However, embodiments are not limited thereto and other suitable materials, such as photopolymers or other rubber-like materials may be used for the sealing gasket 115.

Illustrative embodiments have been described, hereinabove. It will be apparent to those skilled in the art that the above apparatuses and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A backguard panel for a cooking appliance comprising:
   a front wall comprising an outward-facing surface that is to be observed by a user of the cooking appliance and an inward-facing surface that defines an interior of the backguard panel;
   an opening defined by the front wall;
   a control unit comprising a housing with exterior dimensions that closely approximate inside dimensions of said opening, said opening being adapted to receive the control unit from a front side of the backguard panel, the control unit further comprising a transparent pane that extends entirely over the opening and comprises a flanged region that abuts against the outward-facing surface of the front wall; and
   at least one bracket extending from the inward-facing surface of the front wall for temporarily coupling the control unit to the backguard panel until a separate fastener is installed to secure the control unit in place.

2. The backguard panel according to claim 1, further comprising a recessed seat surrounding the opening, wherein the recessed seat is configured to receive a sealing gasket for sealing a space between the control unit and a surrounding portion of the front wall.

3. The backguard panel according to claim 1, wherein the at least one bracket is integrally formed as a monolithic unit as part of the backguard panel.

4. The backguard panel according to claim 3, wherein the at least one bracket comprises an inward-extending flange defining an aperture adapted to receive a fastener for securing the control unit to the backguard panel.

5. The backguard panel according to claim 4, wherein the aperture of the inward-extending flange is arranged to be aligned with a bore formed in the housing of the control unit when the control unit is inserted from a front of the backguard panel through said opening defined by the front wall and into said interior of the backguard panel.

6. A cooking appliance comprising:
   a cabinet housing an oven cavity and a cooktop that are operable to heat food items; and
   a backguard panel comprising:
      a front wall supporting an input device for controlling a cooking operation utilizing at least one of the oven cavity and the cooktop, the front wall comprising an outward-facing surface that is viewed from in front of the cooking appliance and a rearward-facing surface;
      an opening defined by the front wall;
      a control unit that extends into the opening, the control unit being inserted from the outward-facing surface of the front wall and being operatively connected to the input device for receiving a control signal from the input device;
      a glass pane that extends entirely over the opening to cover the control unit, wherein the glass pane comprises a flanged region that abuts against the outward-facing surface of the front wall;
      at least one bracket extending from the inward-facing surface of the front wall that temporarily couples the control unit to the backguard panel; and
      separate fasteners in communication with the at least one bracket and the control unit to secure the control to the backguard panel.

7. The cooking appliance of claim 6, wherein the at least one bracket is integrally formed as a monolithic unit with the rearward-facing surface of the front wall.

8. The cooking appliance of claim 6, wherein the at least one bracket comprises an inward-extending flange defining an aperture that receives the separate fastener for securing the control unit to the backguard panel.

9. The cooking appliance of claim 6 further comprising:
a recessed seat formed in a region of the front wall surrounding the opening; and
a sealing gasket received within the recessed seat and encircling the control unit for sealing a space between the control unit and a surrounding portion of the front wall.

10. The cooking appliance of claim 6, wherein the glass pane is coupled to a housing of the control unit extending into the opening and the flanged portion of the glass pane extends outwardly beyond a periphery of the housing.

11. The cooking appliance of claim 10, wherein the glass pane comprises an exposed surface that protrudes forward of the outward-facing surface of the front wall.

12. A method of assembling a cooking appliance comprising:
inserting, from a front side of a backguard panel, a housing of a control unit into an opening formed in the backguard panel;
urging the control unit into the opening until a flanged portion of a glass pane coupled to the control unit abuts against an outward-facing surface of the backguard panel and the control unit is temporarily held in place by a friction fit between the control unit and at least one bracket extending from a rearward-facing surface of the backguard panel; and
while the control unit is being temporarily held in place by the at least one bracket, installing a separate fastener to secure the control unit to the backguard panel.

13. The method of claim 12 further comprising installing a gasket to be disposed between the control unit and a surrounding portion of the backguard panel.

14. The method of claim 12, wherein said installing the separate fastener comprises inserting a threaded fastener into aligned apertures formed in the housing of the control unit and in the at least one bracket.

* * * * *